United States Patent
Jang et al.

(10) Patent No.: US 10,989,553 B2
(45) Date of Patent: Apr. 27, 2021

(54) METHOD, APPARATUS AND COMPUTER PROGRAM PRODUCT FOR DETERMINING LIKELIHOOD OF A ROUTE

(71) Applicant: HERE Global B.V., Eindhoven (NL)

(72) Inventors: Dongwook Jang, Lisle, IL (US); Gavril Giurgiu, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 402 days.

(21) Appl. No.: 15/955,341

(22) Filed: Apr. 17, 2018

(65) Prior Publication Data
US 2019/0316925 A1 Oct. 17, 2019

(51) Int. Cl.
*G01C 21/34* (2006.01)
*G05D 1/02* (2020.01)

(52) U.S. Cl.
CPC ..... *G01C 21/3484* (2013.01); *G01C 21/3446* (2013.01); *G01C 21/3453* (2013.01); *G01C 21/3461* (2013.01); *G01C 21/3492* (2013.01); *G05D 1/0212* (2013.01); *G05D 1/0221* (2013.01)

(58) Field of Classification Search
CPC ............ G01C 21/3484; G01C 21/3461; G01C 21/3453; G01C 21/3446; G01C 21/3492; G05D 1/0212; G05D 1/0221
See application file for complete search history.

(56) References Cited

U.S. PATENT DOCUMENTS

| | | | |
|---|---|---|---|
| 6,223,124 B1 | 4/2001 | Matsuno et al. | |
| 8,126,641 B2 | 2/2012 | Horvitz | |
| 8,538,686 B2 * | 9/2013 | Gruen et al. | G01C 21/3617 701/533 |
| 9,299,023 B2 * | 3/2016 | Wilson | G01C 21/32 |
| 9,566,982 B2 | 2/2017 | Wilson | |
| 9,726,505 B2 | 8/2017 | Manoliu et al. | |

(Continued)

FOREIGN PATENT DOCUMENTS

| | | |
|---|---|---|
| DE | 10 2009 024153 A1 | 12/2010 |
| DE | 10 2011 078946 A1 | 1/2013 |
| WO | WO 2014/068094 A1 | 5/2014 |

OTHER PUBLICATIONS

Bracht, A., *ADASIS V2 Protocol* (Research Paper), ADASIS Forum (dated Dec. 2013) 182 pages.

(Continued)

*Primary Examiner* — Dale W Hilgendorf
(74) *Attorney, Agent, or Firm* — Alston & Bird LLP

(57) ABSTRACT

Provided herein is a method for establishing the likelihood of a user traversing each of a plurality of paths through a network of roads. Methods may include: determining a location and direction of travel within a road network; determining a first road segment corresponding to the determined location and direction; determining a first set of available road segments at an end of the first road segment corresponding to the determined location in the direction of the determined direction of travel, where each available road segment of the first set has a first end proximate the end of the first road segment and a second end, between which the respective road segment extends; and calculating a probability for each available road segment of the first set of available road segments at the end of the first road segment.

20 Claims, 5 Drawing Sheets

(56) References Cited

U.S. PATENT DOCUMENTS

| | | | |
|---|---|---|---|
| 9,869,563 B2* | 1/2018 | Broadbent et al. | ........................ G01C 21/3453 |
| 9,964,412 B2* | 5/2018 | Broadbent et al. | ........................ G01C 21/3461 |
| 2008/0004802 A1* | 1/2008 | Horvitz | .............. G01C 21/3415 701/533 |
| 2010/0010733 A1* | 1/2010 | Krumm | .............. G01C 21/3484 701/533 |
| 2012/0303222 A1 | 11/2012 | Cooprider et al. | |
| 2013/0006531 A1 | 1/2013 | Gee et al. | |
| 2013/0173150 A1* | 7/2013 | Ghisio | ............... G01C 21/3453 701/423 |
| 2015/0160025 A1* | 6/2015 | Konig | ................ G01C 21/3492 701/410 |
| 2016/0069695 A1* | 3/2016 | Broadbent et al. | ........................ G01C 21/3453 701/411 |
| 2017/0268894 A1* | 9/2017 | Rolf et al. | ......... G01C 21/3461 |
| 2018/0017407 A1* | 1/2018 | Dousse | .............. G01C 21/3476 |
| 2018/0058870 A1* | 3/2018 | Gaebler et al. | .... G01C 21/3461 |
| 2018/0238702 A1* | 8/2018 | Liebinger et al. | ........................ G01C 21/3461 |

OTHER PUBLICATIONS

Pu, H., *Dynamic eHorizon with Traffic Light Information for Efficent Urban Traffic* (Research Paper), Springer International Publishing, (dated Jan. 2016) pp. 15-24.
ADAS-RP User Manual, HERE (dated 2017) 232 pages.
Extended European Search Report for Application No. 19 16 7647 dated Oct. 2, 2019, 8 pages.

* cited by examiner

METHOD, APPARATUS AND COMPUTER PROGRAM PRODUCT FOR DETERMINING LIKELIHOOD OF A ROUTE

TECHNOLOGICAL FIELD

An example embodiment of the present invention relates generally to determining the likelihood of a user traversing a particular path or route, and more particularly, to a method, apparatus and computer program product for determining a probability that a user will traverse each of a plurality of sequences of road segments forming a route or path.

BACKGROUND

Maps have been used for centuries for providing route geometry and geographical information, while routes have conventionally been planned by hand along paths defined by the maps. The evolution of paper maps to electronic, digital maps has led to advances in various aspects of cartography, navigation, and route guidance. Digital maps and navigation can provide dynamic route guidance to users as they travel along a route, or general assistance to a user when no specific destination has been selected. Further, dynamic map attributes such as route traffic, route conditions, and other dynamic map-related information may be provided to enhance the digital maps and facilitate navigation and driver assistance through situational awareness. Typical digital maps and navigation systems may have copious amounts of information available, from various road network geometry awareness to accident, construction, and other traffic-related dynamically updated data. This data is often unused unless a destination has been selected and route guidance to the destination planned.

BRIEF SUMMARY

A method, apparatus, and computer program product are therefore provided for determining the probability that a number of paths comprising road segments will be traversed by a user based on the user's location. Embodiments may include an apparatus to facilitate navigation assistance including at least one processor and at least one non-transitory memory including computer program code instructions. The computer program code instructions may be configured to, when executed, cause the apparatus to at least: determine from probe data a location and direction of travel within a road network; determine a first road segment corresponding to the determined location and direction; determine a first set of available road segments at an end of the first road segment corresponding to the determined location in the direction of travel of the determined direction of travel, where each available road segment of the first set has a first end proximate the end of the first road segment and a second end, between which the respective road segment extends; calculate a probability for one or more available road segment of the first set of available road segments at the second ends of the first set of available road segments, where the calculated probability for the one or more available road segment of the second set reflects a likelihood of a user selecting the respective one of the one or more available road segment of the second set; and receive data related to road segments having a probability satisfying a predetermined threshold, where the data facilitates at least one of navigational assistance or semi-autonomous driving. The apparatus of example embodiments may optionally be caused to determine a change in location from a location corresponding to the first road segment to a new location corresponding to one of the first set of available road segments; determine a subset of the second set of available road segments including the available road segments extending from the second end of the one of the first set of available road segments; and calculate a new probability for the one or more of the available road segments of the subset of the second set of available road segments, the subset of the second set of available road segments each extending from a first end proximate the second end of the one of the first set of available road segments to a second end.

According to some embodiments, the apparatus may be caused to: determine a third set of available road segments, where the third set of available road segments includes road segments extending from at least one of the second ends of the subset of the second set of available road segments; and calculate a probability for one or more available road segment of the third set of available road segments at the second ends of the subset of the second set of available road segments, where the calculated probability for the one or more available road segment of the second set reflects a likelihood of a user selecting the respective one of the one or more available road segment of the second set. A probability of the one of the first set of available road segments corresponding to the new locations is established as 1.0. A probability of one or more available road segment of the subset of the second set of available road segments increases in response to the new location corresponding to the one of the first set of available road segments, and a probability of the one or more available road segment of the second set of available road segments not in the subset of the second set of available road segments decreases in response to the new location corresponding to the one of the first set of available road segments.

According to some embodiments, a probability for one or more available road segment may be established based, at least in part, on a functional class of the respective available road segment. A probability for the one or more available road segment is established based, at least in part, on a distance attribute of the respective available road segment, where the distance attribute is inversely proportional of a distance to the respective road segment from the determined location. A probability for the one or more available road segment may be established based, at least in part, on a turn angle attribute of the respective available road segment. The apparatus of example embodiments may optionally be caused to: store the received data related to road segments having a probability satisfying a predetermined threshold in the memory; and purge the received data related to road segments in response to their respective probability failing to satisfy a second predetermined threshold. The data related to road segments having a probability satisfying a predetermined threshold includes at least one of traffic data or point of interest data.

Embodiments of the present invention may provide a computer program product including at least one non-transitory computer-readable storage medium having computer-executable program code instructions stored therein. The computer-executable program code instructions may include program code instructions to: determine a location and direction of travel within a road network; determine a first road segment corresponding to the determined location and direction; determine a first set of available road segments at an end of the first road segment corresponding to the determined location in the direction of the determined direction of travel, wherein the one or more available road segment of the first set has a first end proximate the end of the first road segment and a second end, between which the respective road segment extends; calculate a probability for one or more available road segment of the first set of available road segments at the end of the first road segment, where the calculated probability for the one or more available road segment of the first set reflects a likelihood of a user selecting the respective one of the one or more available road segment of the first set upon reaching the end of the first road segment; determine a second set of available road segments, where the second set of available road segments includes road segments extending from at least one of the second ends of the first set of available road segments; calculate a probability for one or more available road segment of the second set of available road segments at the second ends of the first set of available road segments, where the calculated probability for the one or more available road segment of the second set reflects a likelihood of a user selecting the respective one of the one or more available road segment of the second set; and receive data related to road segments having a probability satisfying a predetermined threshold, where the data facilitates at least one of navigational assistance or semi-autonomous driving.

According to some embodiments, the computer program product may include program code instructions to: determine a change in location from a location corresponding to the first road segment to a new location corresponding to one of the first set of available road segments; determine a subset of the second set of available road segments comprising the available road segments extending from the second end of the one of the first set of available road segments; and calculate a new probability for the one or more of the available road segments of the subset of the second set of available road segments, the subset of the second set of available road segments each extending from a first end proximate the second end of the one of the first set of available road segments to a second end.

Example embodiments may optionally include program code instructions to: determine a third set of available road segments, where the third set of available road segments includes road segments extending from at least one of the second ends of the subset of the second set of available road segments; and calculate a probability for one or more available road segment of the available road segments at the second ends of the subset of the second set of available road segments, where the calculated probability for the one or more available road segment of the second set reflects a likelihood of a user selecting the respective one of the one or more available road segment of the second set. A probability of the one of the first set of available road segments corresponding to the new location is established as 1.0. A probability of the one or more available road segment of the subset of the second set of available road segments increases in response to the new location corresponding to the one of the first set of available road segments, and where a probability of the one or more available road segment of the second set of available road segments not in the subset of the second set of available road segments decreases in response to the new location corresponding to the one of the first set of available road segments.

According to some embodiments, a probability for the one or more available road segment may be established based, at least in part, on a functional class of the respective available road segment. A probability for the one or more available road segment may be based, at least in part, on a distance attribute of the respective available road segment, where the distance attribute is inversely proportional to a distance to the respective road segment from the determined location. A probability for the one or more available road segment may be established based, at least in part, on a turn angle attribute of the respective available road segment.

Embodiments of the present invention may provide a method for operating an advanced driver assistance system. The methods may include: determining a location and direction of travel within a road network; determining a first road segment corresponding to the determined location and direction; determining a first set of available road segments at an end of the first road segment corresponding to the determined location in the direction of the determined direction of travel, where the one or more available road segment of the first set has a first end proximate the end of the first road segment and a second end, between which the respective road segment extends; calculating a probability for one or more available road segment of the first set of available road segments at the end of the first road segment, where the calculated probability for the one or more available road segment of the first set reflects a likelihood of a user selecting the respective one of the one or more available road segment of the first set upon reaching the end of the first road segment; determining a second set of available road segments, where the second set of available road segments includes road segments extending from at least one of the second ends of the first set of available road segments; calculating a probability for one or more available road segment of the second set of available road segments at the second ends of the first set of available road segments, where the calculated probability for the one or more available road segment of the second set reflects a likelihood of a user selecting the respective one of the one or more available road segment of the second set; and receiving data related to road segments having a probability satisfying a predetermined threshold, where the data facilitates at least one of navigational assistance or semi-autonomous driving.

Methods may include: determining a change in location from a location corresponding to the first road segment to a new location corresponding to one of the first set of available road segments; determining a subset of the second set of available road segments including the available road segments extending from the second end of the one of the first set of available road segments; calculating a new probability for the one or more of the available road segments of the subset of the second set of available road segments, the subset of the second set of available road segments each extending from a first end proximate the second end of the one of the first set of available road segments to a second end.

Embodiments of the present invention may provide an apparatus including means for operating an advanced driver assistance system. The apparatus may include: means for determining a location and direction of travel within a road network; means for determining a first road segment corresponding to the determined location and direction; means for determining a first set of available road segments at an end of the first road segment corresponding to the determined location in the direction of the determined direction of travel, where one or more available road segment of the first set has a first end proximate the end of the first road segment and a second end, between which the respective road segment extends; means for calculating a probability for one or more available road segment of the first set of available road segments at the end of the first road segment, where the calculated probability for the one or more available road segment of the first set reflects a likelihood of a user selecting the respective one of the one or more available road segment of the first set upon reaching the end of the first road segment; means for determining a second set of available road segments, where the second set of available road segments includes road segments extending from at least one of the second ends of the first set of available road segments; means for calculating a probability for one or more available road segment of the second set of available road segments at the second ends of the first set of available road segments, where the calculated probability for the one or more available road segment of the second set reflects a likelihood of a user selecting the respective one of the one or more available road segment of the second set; and means for receiving data related to road segments having a probability satisfying a predetermined threshold, where the data facilitates at least one of navigational assistance or semi-autonomous driving.

The apparatus may include: means for determining a change in location from a location corresponding to the first road segment to a new location corresponding to one of the first set of available road segments; means for determining a subset of the second set of available road segments including the available road segments extending from the second end of the one of the first set of available road segments; means for calculating a new probability for the one or more of the available road segments of the subset of the second set of available road segments, the subset of the second set of available road segments each extending from a first end proximate the second end of the one of the first set of available road segments to a second end.

BRIEF DESCRIPTION OF THE DRAWINGS

Figure 1:
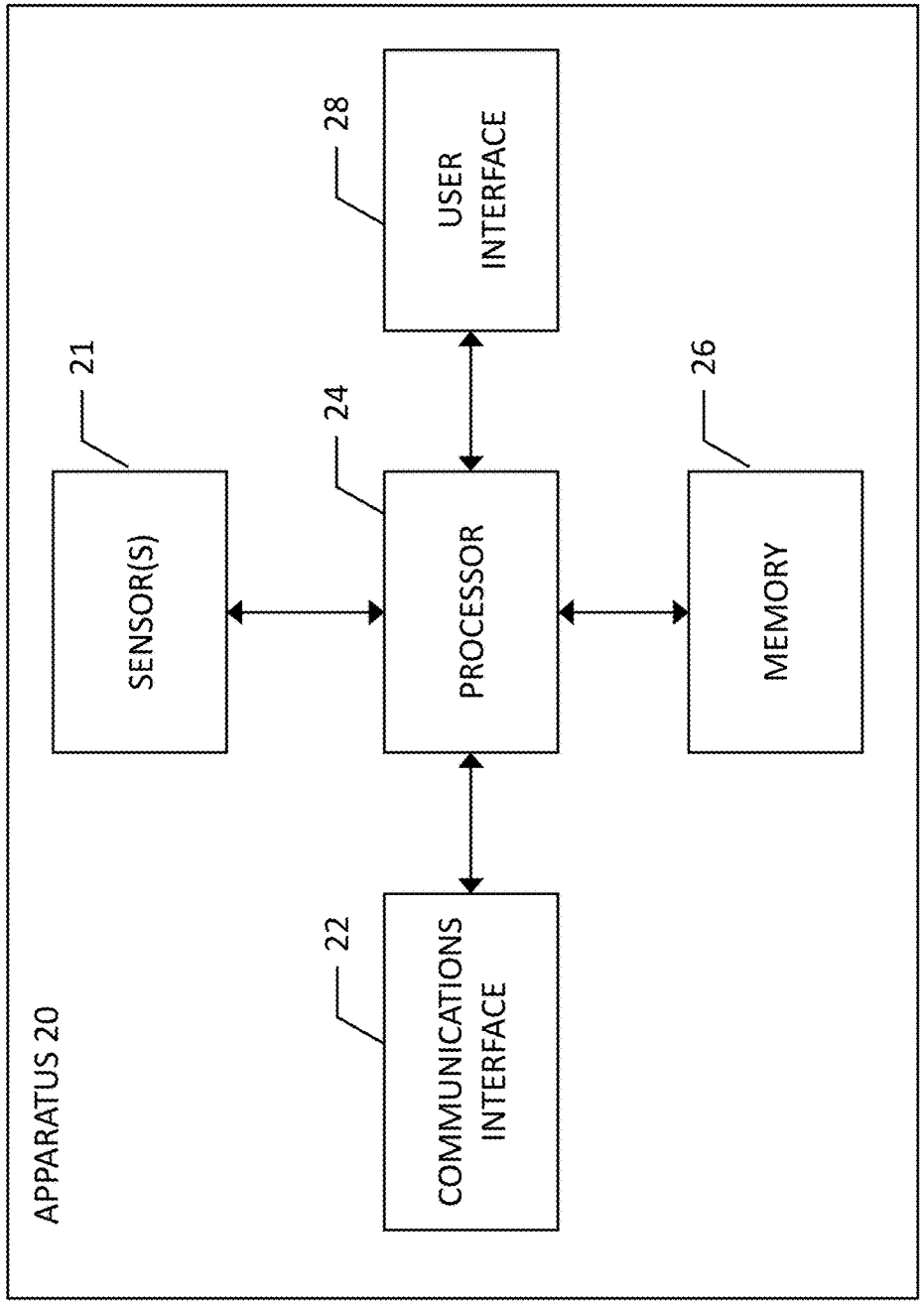
Figure 2:
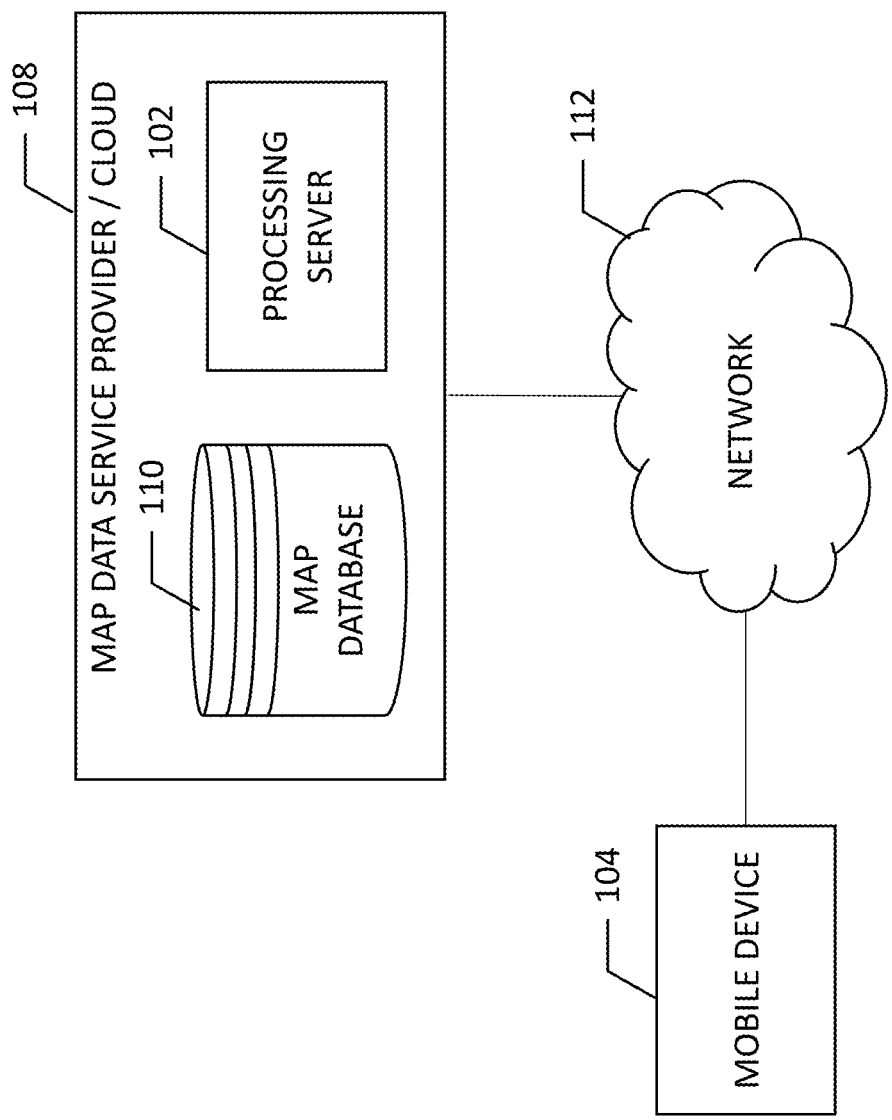
Figure 3:
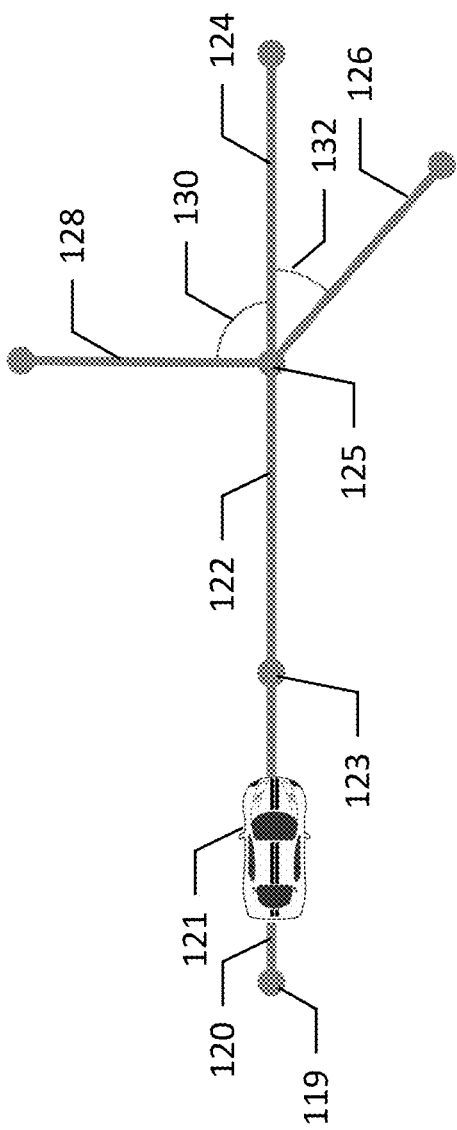
Figure 4:
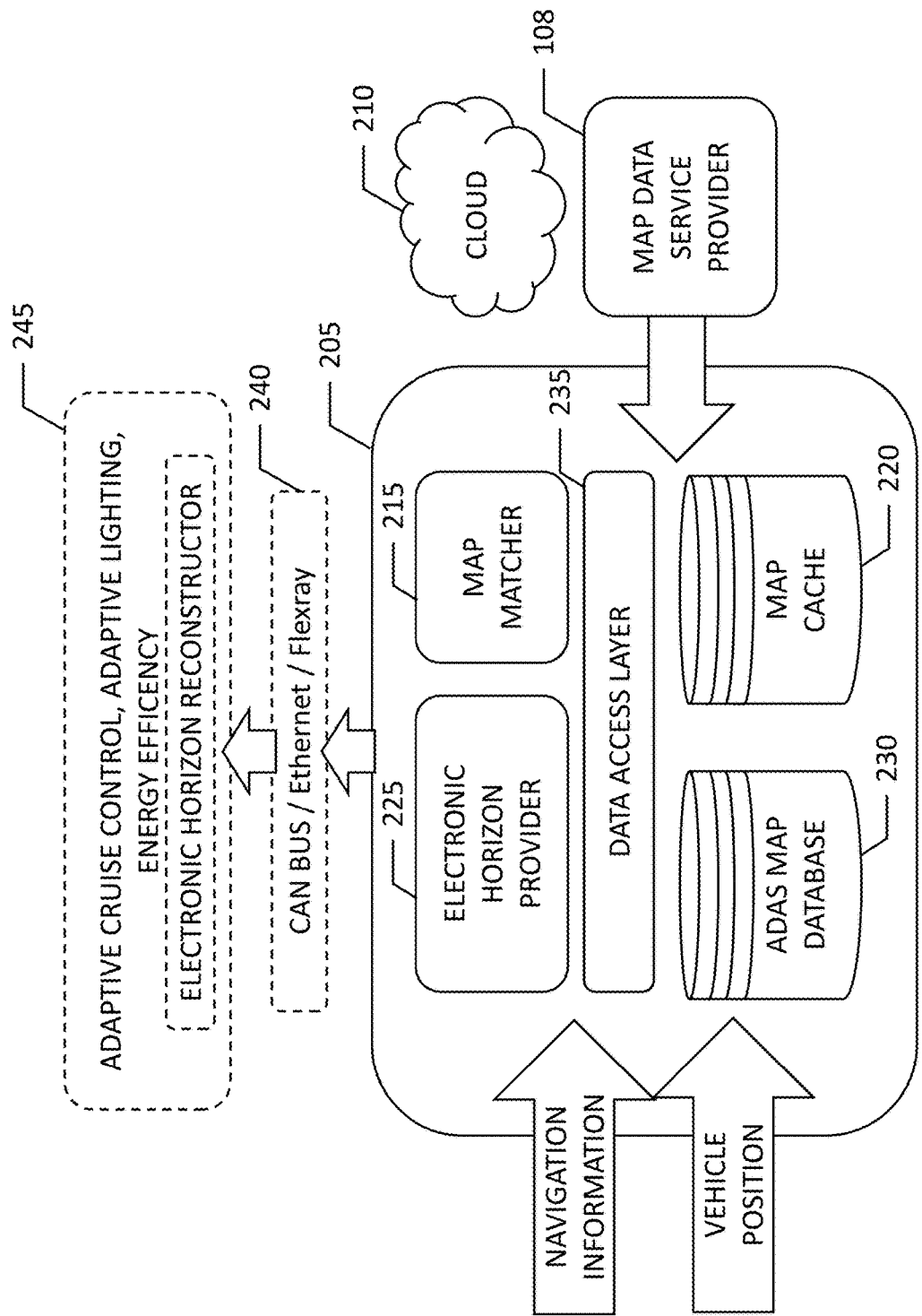
Figure 5:
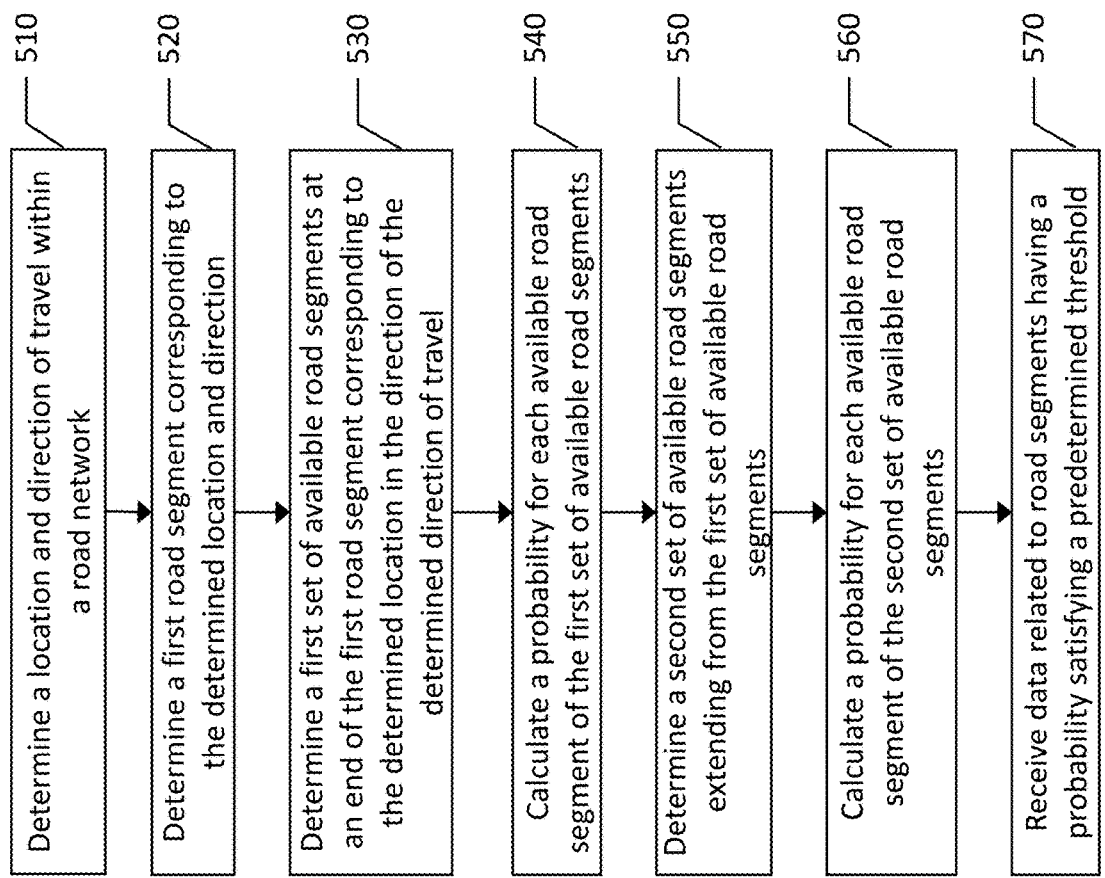

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system for identifying the probability of a plurality of paths comprising road segments according to an example embodiment of the present invention;

FIG. 3 is an illustration of a plurality of road segments among a network of roads according to an example embodiment of the present invention;

FIG. 4 is another block diagram of a system for identifying the probability or likelihood of traversal of a plurality of paths comprising road segments according to an example embodiment of the present invention; and FIG. 5 is a flowchart of operations for identifying the probability or likelihood of traversal of a plurality of paths comprising road segments to facilitate navigational assistance, autonomous, or semi-autonomous vehicle control according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for determining a likelihood or probability that a user will travel along a particular path comprising a sequence of road segments. In this regard, embodiments may calculate the probability that a user will travel along a particular road segment based on a plurality of properties of the road segment, along with historical information regarding the frequency of traveled paths, and/or a history of possible destinations for a user. As a user travels along a chosen path, the probabilities of traversing other road segments may be recalculated to establish a most probable path, and other, less probable paths that may be taken by a user. While embodiments described herein reference a "most probable path", embodiments may include a probable path or a path satisfying a predetermined likelihood of being traversed by a user/vehicle, such that the "most" probable path is used as an example and is not intended to be limiting.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. According to an example embodiment, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Such a device may include an advanced driver assistance system or ADAS as described further below. Optionally, the computing device may be a fixed computing device, such as a built-in vehicular navigation device, assisted driving device, or the like. According to some embodiments, the computing device may be a mobile device that is portable from one vehicle to another, such as a mobile navigation device, smart phone, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, LIDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication or may alternatively support vehicle to vehicle or vehicle to infrastructure wireless links.

The apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Devices such as an ADAS may operate according to the ADASIS (Advanced Driver Assistance System Interface Specification) protocol. In the ADASIS protocol, a road network may be represented as a directed graph. Road segments or links currently travelled by a vehicle may be classified as the Most Probable Path (MPP) or Sub-Paths (SP), which may also be considered a sequence of links that satisfy a predetermined likelihood of being traversed by the vehicle. The sequence of road links that may be traversed by a vehicle (e.g., above a predetermined threshold of likelihood), may constitute an "Electronic Horizon" which may optionally be a graph of the road links. The ADASIS describes a road link or link based on the beginning of the link plus an offset distance, which is a distance along a path from an origin. Attributes may have separate profile types and may be connected to each other with the offset. Further, a link identifier profile gives the ID of the link to which a specific part of a path the road link belongs.

To enhance functionality of driver assistance features, embodiments described herein may analyze potential routes or paths of a user and determine a likelihood that a user may travel along various available paths. During navigation assistance or route-guidance assistance, a user may be relatively unlikely to pursue an alternative route to the path along which the user is guided, although there is a chance that the user will detour off of the route guidance selected path and the likelihood of such a decision can also be established in order to provide greater driver assistance as the driver travels along a chosen path. However, wherever opportunity exists for a user to take an alternate path, there exists at least a chance that the alternate route will be taken.

Embodiments described herein anticipate the likelihood of a user or driver of a vehicle traveling along a plurality of paths within a road network. While the most likely path with the highest likelihood of traversal may be the Most Probable Path, other potential paths may be of similar likelihood or of minimal likelihood, but still remain possible paths. Predicting the potential paths along with a likelihood that each path will be traversed enables navigation systems to cache or store data relating to potential paths that may be useful for navigation assistance, point-of-interest identification, or facilitate autonomous or semi-autonomous driving. Detailed road network geometry and points-of-interest along the road network may involve copious amounts of data including data that is routinely updated or changed based on changing road geometries, intersection patterns, points-of-interest, road closures, or the like. As such, maintaining data regarding an entire road network may not be feasible or desirable on a portable or in-vehicle navigation device. Thus, anticipating potential paths of travel of a user traveling along a road network may enable a navigation system to buffer or temporarily store data relating to potential paths to facilitate more efficient processing of map data and to facilitate any of the aforementioned advanced driver assistance features without requiring storage of data relating to the entire network of roadways.

According to an example embodiment of the present invention, a method, apparatus, or computer program product may establish the likelihood that a user will traverse a sequence of road segments or a path within a network of road segments. In order to establish this likelihood, embodiments may determine a path originating at the present location of a user, and propagating out paths from that location. The present location of a user may be the location at which a user or vehicle of a user is located as determined by locationing means, such as global positioning system (GPS), cellular signal triangulation, wireless fingerprinting, or any method capable of determining a location. A trajectory may also be established of the user based on the determination of consecutive location points, where the trajectory provides a direction of travel of a user. The location and trajectory may be map-matched to a position on a road segment within a road network.

Map-matching of a user location to a road segment may evaluate a user's location and trajectory, and determine the road segment that the user is most likely to be traveling along. While map-matching may be straight forward when a user is located along an isolated road segment, such as in a rural area that has sparse roads, map-matching may be more complex when a user is traveling within a dense network of road segments, and/or when a user is traveling among geographic features that preclude highly accurate location estimation of the user, such as in urban canyons or within a densely forested area. As such, the direction of travel, together with the location may be used to establish a map-matched road segment within the network of roads.

Once the location and direction of travel of a user has been map-matched to a road segment, the road segment may be assigned a probability. The road segment along which a user is traveling is assigned a predefined probability, such as a probability of 1.0, or 100%, as it is determined to be 100% likely that the user is traveling along the road segment to which they were map matched. In the event that map-matching is not entirely certain, or within a predefined degree of certainty to which a single road segment is not definitively matched, such as when there are multiple road segments of similar likelihood that the user is traveling along (e.g., close, parallel roadways such as an exit ramp of a highway), the probability assigned to each potential road segment may be less than the predefined probability, such as less than 1.0. Such a diminished probability associated with the current location of a user will impact the likelihood of the user traversing paths associated with each of the potential locations until the user location becomes more certain.

A road network of road segments includes nodes between each road segment, and at the intersection of multiple road segments, as modeled in a digital environment and stored in a memory. A node may be positioned between only two road segments, in which case there are no turn options available at the node. However, nodes may also be located at the intersection of three or more road segments, in which case a vehicle may turn at the node from a first road segment to one of the two or more other road segments. This invites a decision process for a path to be chosen along which the user will travel. While example embodiments may include road segments that are connected by nodes at their ends, road segments may terminate in proximity to one another and not necessarily connect at their ends/nodes. For example, road segments may optionally be overlapping, such as by less than half of a road segment length, where less than half may include less than 25% of the length of a road segment overlapping, or more particularly, less than 10% of the length of a road segment overlapping another road segment.

In an example embodiment in which a user's location and direction of travel result in a map-matched road segment, a node at the end of the map-matched road segment along the direction of travel may present a decision point at which a next road segment, or child road segment is chosen to be traversed as the path of the vehicle. FIG. 3 illustrates an example embodiment of a simplified network of road segments, with road segment 120 being the road segment to which a vehicle 121 has been map-matched to within the network of road segments. According to the illustrated embodiment, no pre-defined route is determined as would be the case during route-guidance of a vehicle to a destination. As shown, the likelihood of road segment 120 being traversed is 1.0, as the vehicle 121 has been affirmatively map-matched to segment 120. Road segment 120 extends between nodes 119 and 123, with the vehicle 121 driving in the direction of node 123. Based on the direction of travel of the vehicle 121, road segments intersecting node 119 are ignored, while road segments in the direction of travel are not. At node 123, a determination is made that the vehicle has only one option for proceeding, which is along road segment 122. As such, the likelihood of the vehicle traversing road segment 122 is 1.0, or substantially close to 1.0. It is possible that the vehicle will stop along segment 120 and park, enter a business, or otherwise stop proceeding along road segment 120, such that the likelihood that the vehicle will traverse segment 122 may not be 1.0, though it will be close to 1.0 given the lack of other options at node 123. The likelihood of the user traversing segment 122 may be influenced (reduced) by points-of-interest located along segment 120 or locations frequented by the user, as will be further described below. Conversely, if segment 120 is an isolated stretch of roadway with no points-of-interest or locations to stop along the segment, the likelihood of the user traversing road segment 122 after segment 120 would be near 100% or 1.0.

According to the example embodiment of FIG. 3, beyond road segment 122 is node 125, at which four road segments intersect (122, 124, 126, and 128). Probabilities or likelihoods of traversal can be assigned to each of the four road segments. As the vehicle is approaching the intersection represented by node 125 along road segment 122, it is highly unlikely that the user will choose road segment 122 upon reaching node 125. Thus, road segment 122 may be assigned a probability of near 0.0. However, determining the likelihood of the vehicle traversing road segments 124, 126, and 128 is considerably more difficult. Numerous factors may be considered in establishing the likelihood of a user traversing a particular road segment.

The most likely road links ahead of a user/vehicle may be predicted in the absence of a predefined route. Based on a current location and a current direction of travel of a user, at each upcoming intersection (node) along each potential path, a likelihood of traversal for each road segment exiting the intersection may be established to determine the most probable path, and other possible paths along with their likelihood of being traversed. A number of factors may influence the determination of likelihood of traversal of a road segment. Factors may include: a functional class attribute based on a functional class of the respective road segment to influence the likelihood that a user will traverse the respective road segment; a distance attribute where the distance from the road segment is inversely proportional to a likelihood of traversal; and a turn-angle attribute with slighter turn angles being more likely than sharp or obtuse turn angles. Other attributes that influence the likelihood of traversal of a road segment may include historical paths of travel of a user or points of interest that are frequented by a user with the likelihood of traversal increasing as historical data suggests the user has taken the paths of travel or visited the points of interest along the paths of travel more often.

For example, with regard to the functional class attribute, if a user is entering an intersection (e.g., node 125) along a minor road 122 (e.g., a rural route or low-traffic road), and the minor road continues straight (e.g., along road segment 124) through the intersection, while a major road (e.g., road segment 128) exits the intersection in another direction, the higher likelihood of travel may be to exit the intersection along the major road as it is more heavily traveled. The functional class of a road segment may be a weighting factor that influences the likelihood that a road segment will be traversed. For example, the weighting factor may evidence an increased likelihood of a road segment being traversed as the functional class attribute transitions from indicating a minor road to indicating a major road.

Further, the direction taken at the intersection may be influenced by a location along the road segment or reachable via the road segment, such as a location that is frequented by a user. The road segments that are frequently traversed by a user or along which a user may travel to reach a frequently visited destination may be given a greater weight when determining the likelihood that a user will traverse the respective road segment. For example, if vehicle 121 is traveling along road segment 120 to segment 122, and their residential address or work address is known to be along road segment 126, the likelihood of the user turning from road segment 122 onto road segment 126 may be considerably more heavily weighted (i.e., more likely) than the user traveling along road segment 124 or 128.

The probability that a road segment may be traversed may be established based on turn prediction, which is the prediction of the most likely path exiting an intersection. Geometric aspects of the intersection may be considered, such as a straighter route exiting an intersection may be weighted more heavily or likely than a turn. Referring again to FIG. 3, if all road segments 124, 126, and 128 exiting the intersection 125 are of the same functional road class and no historical considerations are present, weights may be assigned to each road segment based on the degree of turn required to reach the respective road segment. For example, road segment 124 may be given the highest weight with respect to turn angle since no turn is needed, while road segment 126 may be given the next highest weight as angle 132 is lower than angle 130 required to reach road segment 128, which is afforded the lowest weight with respect to turn angle.

A current road segment along which a vehicle is traveling, such as road segment 120 of FIG. 3, may be referred to as a "parent" road segment, while road segments extending from the parent road segment (e.g., road segment 122) may be "child" road segments, and road segments extending from the "child" road segments may be "grandchild" road segments (e.g., 124, 126, and 128). For each road segment, a probability or likelihood of traversal may be calculated based on the following formula:

$$prob = \Sigma w_i prob_i$$

Where $prob_i$ is a function to calculate a probability of the $i^{th}$ attribute based on parent and child attributes, and where $w_i$ is the weight for the $i^{th}$ attribute. Using this formula, the probability of a road segment of a path may be established as:

$$prob_{child} = prob_{parent} \cdot prob$$

Where $prob_{child}$ is a probability that a child road segment will be traversed and is calculated based on the probability that the respective child road segment will be chosen from the parent road segment and multiplied by the probability that the parent road segment will be traversed—$prob_{parent}$.

The process of establishing the likelihood of traversal of a road segment may be calculated for a tree-like structure of paths until each downstream path reaches a maximum length. The maximum length for a path may be user-defined, may be based on road segment density, or may be a predefined value. For example, a maximum length may be ten kilometers. However, in rural areas where roads may be sparse, the maximum length may be increased as there are fewer available road segments to traverse, and intersections may be separated by long distances. Conversely, in urban environments such as city centers, the number of intersections and potential paths may be very large such that the maximum length of a path may be shortened to a kilometer or less.

The likelihood of a user traversing a road segment may be established based on a probability that a user will turn onto the respective road segment at an intersection from which the road segment exits. Given a set of turn probabilities at an intersection, these probabilities may be recursively propagated into the road network, such that each segment of road or road segment has an associated probability or likelihood that the user may traverse that particular section of road. The probability may decrease proportionally to the number of turns needed to reach a particular road segment. Thus, in a network of roads that are proximate or within a predefined distance of the current location of a user, each road segment has a probability that the user will actually traverse that section of road. The recursive propagation of turn probabilities may be stopped in response to a threshold criteria such as a minimum probability that a user will traverse a particular road segment or a maximum number of turns required to get to a particular road segment. If a road segment can be reached by multiple paths, the probabilities may be summed to reach a cumulative probability, or alternatively, the maximum probability from among the different paths may be selected as the probability for that particular road segment.

The probability or likelihood that a user will traverse a road segment may be influenced by various factors as described above that contribute to the probability score or likelihood that a user will traverse the road segment. Factors include: the functional class of the road segment, the distance to the road segment from the current location, the angle of turn required to reach the road segment, the familiarity of a location along or reached via the road segment, etc. A most probable path is determined to follow from the road segment associated with the current location of the user to the child segment with the highest probability. When the user moves to one of the child segments, the parent segment is removed and the selected child segment becomes the parent road segment and assigned a predefined probability, such as a probability of 1.0. Probabilities of all downstream children road segments may also be recalculated. If the maximum length of one or more paths is not reached, if the maximum number of turns in any path is not reached, or if the most distal road segments are above a predefined minimum threshold likelihood of traversal, additional road segments may be added to each path along with their likelihood of traversal until the relevant limit is reached (e.g., distance, turns, or minimum likelihood).

The road segments of the paths may be ranked according to their weighted likelihood of being traversed according to the following formula:

$$R = \Sigma w_i a_i$$

Where R is the ranking score of the road segment, $a_i$ is the $i^{th}$ attributes, and $w_i$ is the $i^{th}$ weight. Attributes include any of the aforementioned attributes, such as:

$a_{fc}$—functional class attribute—defined as the probability of functional class.

$a_d$—distance attribute—defined as inverse of the distance from the current location.

$a_{ang}$—angle attribute—defined as the probability of turning angle $a_f$—familiarity attribute—defined as the familiarity of a destination on or reachable by the road segment.

FIG. 4 illustrates an example embodiment of architecture specifically configured for implementing embodiments described herein. The illustrated embodiment of FIG. 4 may be vehicle-based, where information regarding map data is provided via a map data service provider 108 and vehicle position along with navigation information is established based on data received at the vehicle. As illustrated, the architecture includes a map data service provider 108 that provides map data to the Electronic Horizon service 205, which may be vehicle-based or server based depending upon application. Embodiments include an electronic horizon provider 225, an ADAS map database, 230, and a data access layer 235. The map data service provider may be a cloud-based 210 service. The Electronic Horizon receives navigation information and vehicle position and uses that information to map-match 215 the position to a road link on a map tile of the mapped network of roads stored in the map cache 220. This link, along with the direction of travel, establishes the probable path of the vehicle or most probable path. Accordingly, sub-paths are determined to be the next road links that the vehicle can reach from the current location with probabilities of the vehicle traversing each link attached to the link. The paths established as most probable and sub-paths may be sent sent via the CAN (computer area network) BUS (or Ethernet or Flexray) 240 to the electronic control unit (ECU) 245 of the vehicle to implement ADAS functionality, such as various forms of autonomous or assisted driving, or navigation assistance.

FIG. 5 illustrates a flowchart depicting various methods according to example embodiments of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 illustrates a flowchart of a method for facilitating autonomous or semi-autonomous vehicle control through the identification of potential paths from a current location through a network of roads.

In an example embodiment, an apparatus for performing the method of FIG. 5 above may comprise a processor (e.g., the processor 24) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to facilitate navigation assistance comprising at least one processor and at least one non-transitory memory including computer program code instructions, the computer program code instructions configured to, when executed, cause the apparatus to at least:
   determine from probe data a location and direction of travel within a road network;
   determine a first road segment corresponding to the determined location and direction;
   determine a first set of available road segments at an end of the first road segment corresponding to the determined location in the direction of the determined direction of travel, wherein each available road segment of the first set has a first end proximate the end of the first road segment and a second end, between which the respective road segment extends;
   calculate one or more first probabilities for one or more available road segments of the first set of available road segments at the end of the first road segment, wherein the calculated one or more first probabilities for the one or more available road segments of the first set reflects a respective likelihood of a user selecting a respective one of the one or more available road segment of the first set upon reaching the end of the first road segment and wherein the one or more first probabilities for the one or more available road segments of the first set are established based, at least in part, on a functional class of the respective available road segment;
   determine a second set of available road segments, wherein the second set of available road segments comprises road segments extending from at least one of the second ends of the first set of available road segments;
   calculate one or more second probabilities for one or more available road segments of the second set of available road segments at the second ends of the first set of available road segments, wherein the calculated one or more second probabilities for the one or more available road segment of the second set reflects a respective likelihood of the user selecting the respective one of the one or more available road segment of the second set;
   receive data related to road segments having a respective probability satisfying a predetermined threshold; and
   providing navigational assistance to one of the user and a vehicle based on the received data, in order to direct driving of the vehicle.

2. The apparatus of claim 1, wherein the apparatus is further caused to:
   determine a change in location from a location corresponding to the first road segment to a new location corresponding to one of the first set of available road segments;
   determine a subset of the second set of available road segments comprising the available road segments extending from the second end of the one of the first set of available road segments; and
   calculate one or more new probabilities for the one or more of the available road segments of the subset of the second set of available road segments, the subset of the second set of available road segments each extending from a first end proximate the second end of the one of the first set of available road segments to a second end.

3. The apparatus of claim 2, wherein the apparatus is further caused to:
   determine a third set of available road segments, wherein the third set of available road segments comprises road segments extending from at least one of the second ends of the subset of the second set of available road segments; and calculate one or more third probabilities for the one or more available road segment of the third set of available road segments at the second ends of the subset of the second set of available road segments, wherein the calculated one or more third probabilities for the one or more available road segment of the third set reflects a respective likelihood of the user selecting the respective one of the one or more available road segment of the third set.

4. The apparatus of claim 2, wherein the one or more first probabilities of the one of the first set of available road segments corresponding to the new locations is established as 1.0.

5. The apparatus of claim 2, wherein the one or more second probabilities of the one or more available road segments of the subset of the second set of available road segments increases in response to the new location corresponding to the one of the first set of available road segments, and wherein the one or more second probabilities of the one or more available road segment of the second set of available road segments not in the subset of the second set of available road segments decreases in response to the new location corresponding to the one of the first set of available road segments.

6. The apparatus of claim 1, wherein the one or more second probabilities for the one or more available road segments of the second set is established based, at least in part, on a distance attribute of the respective available road segment, wherein the distance attribute is inversely proportional to a distance to the respective road segment from the determined location.

7. The apparatus of claim 1, wherein the one or more first probabilities for the one or more available road segments of the first set is established based, at least in part, on a turn angle attribute of the respective available road segment.

8. The apparatus of claim 1, wherein the apparatus is further caused to:
store the received data related to road segments having a respective probability satisfying the predetermined threshold in the memory; and
purge the received data related to road segments in response to their respective probability failing to satisfy a second predetermined threshold.

9. The apparatus of claim 1, wherein the data related to road segments having a respective probability satisfying the predetermined threshold comprises at least one of traffic data or point of interest data.

10. A computer program product comprising at least one non-transitory computer-readable storage medium having computer-executable program code instructions stored therein, the computer-executable program code instructions comprising program code instructions to:
determine a location and direction of travel within a road network;
determine a first road segment corresponding to the determined location and direction;
determine a first set of available road segments at an end of the first road segment corresponding to the determined location in the direction of the determined direction of travel, wherein one or more available road segment of the first set has a first end proximate the end of the first road segment and a second end, between which the respective road segment extends;
calculate one or more first probabilities for the one or more available road segments of the first set of available road segments at the end of the first road segment, wherein the calculated one or more probabilities for the one or more available road segment of the first set reflects a respective likelihood of a user selecting a respective one of the one or more available road segment of the first set upon reaching the end of the first road segment;
determine a second set of available road segments, wherein the second set of available road segments comprises road segments extending from at least one of the second ends of the first set of available road segments;
calculate one or more second probabilities for one or more available road segments of the second set of available road segments at the second ends of the first set of available road segments, wherein the calculated one or more second probabilities for the one or more available road segments of the second set reflects a respective likelihood of the user selecting a respective one of the one or more available road segment of the second set, wherein the one or more second probabilities for the one or more available road segments of the second set is established based, at least in part, on a distance attribute of the respective available road segment, wherein the distance attribute is inversely proportional to a distance to the respective road segment from the determined location;
receive data related to road segments having a respective probability satisfying a predetermined threshold; and
providing navigational assistance to one of the user and a vehicle based on the received data, in order to direct driving of the vehicle.

11. The computer program product of claim 10, further comprising program code instructions to:
determine a change in location from a location corresponding to the first road segment to a new location corresponding to one of the first set of available road segments;
determine a subset of the second set of available road segments comprising the available road segments extending from the second end of the one of the first set of available road segments; and
calculate one or more new probabilities for the one or more of the available road segments of the subset of the second set of available road segments, the subset of the second set of available road segments each extending from a first end proximate the second end of the one of the first set of available road segments to a second end.

12. The computer program product of claim 11, further comprising program code instructions to:
determine a third set of available road segments, wherein the third set of available road segments comprises road segments extending from at least one of the second ends of the subset of the second set of available road segments; and
calculate one or more third probabilities for one or more available road segment of the third set of available road segments at the second ends of the subset of the second set of available road segments, wherein the calculated one or more third probabilities for the one or more available road segment of the third set reflects a respective likelihood of the user selecting the respective one of the one or more available road segment of the third set.

13. The computer program product of claim 11, wherein the one or more first probabilities of the one of the first set of available road segments corresponding to the new location is established as 1.0.

14. The computer program product of claim 11, wherein the one or more second probabilities of the one or more available road segment of the subset of the second set of available road segments increases in response to the new location corresponding to the one of the first set of available road segments, and wherein the one or more second probabilities of the one or more available road segment of the second set of available road segments not in the subset of the second set of available road segments decreases in response to the new location corresponding to the one of the first set of available road segments.

15. The computer program product of claim 10, wherein the one or more first probabilities for the one or more available road segments of the first set is established based, at least in part, on a functional class of the respective available road segment.

16. The computer program product of claim 10, wherein the one or more first probabilities for the one or more available road segments of the first set is established based, at least in part, on a turn angle attribute of the respective available road segment.

17. A method for operating an advanced driver assistance system comprising:
 determining a location and direction of travel within a road network;
 determining a first road segment corresponding to the determined location and direction;
 determining a first set of available road segments at an end of the first road segment corresponding to the determined location in the direction of the determined direction of travel, wherein each available road segment of the first set has a first end proximate the end of the first road segment and a second end, between which the respective road segment extends;
 calculating one or more first probabilities for one or more available road segment of the first set of available road segments at the end of the first road segment, wherein the calculated one or more first probabilities for the one or more available road segment of the first set reflects a respective likelihood of a user selecting a respective one of the one or more available road segment of the first set upon reaching the end of the first road segment, wherein the one or more first probabilities for the one or more available road segments of the first set is established based, at least in part, on a turn angle attribute of the respective available road segment;
 determining a second set of available road segments, wherein the second set of available road segments comprises road segments extending from at least one of the second ends of the first set of available road segments;
 calculating one or more second probabilities for one or more available road segment of the second set of available road segments at the second ends of the first set of available road segments, wherein the calculated one or more second probabilities for the one or more available road segment of the second set reflects a respective likelihood of the user selecting the respective one of the one or more available road segment of the second set; and
 receiving data related to road segments having a respective probability satisfying a predetermined threshold; and
 providing navigational assistance to one of the user and a vehicle based on the received data, in order to direct driving of the vehicle.

18. The method of claim 17, further comprising:
 determining a change in location from a location corresponding to the first road segment to a new location corresponding to one of the first set of available road segments;
 determining a subset of the second set of available road segments comprising the available road segments extending from the second end of the one of the first set of available road segments;
 calculating one or more new probabilities for the one or more of the available road segments of the subset of the second set of available road segments, the subset of the second set of available road segments each extending from a first end proximate the second end of the one of the first set of available road segments to a second end
 determining a third set of available road segments, wherein the third set of available road segments comprises road segments extending from at least one of the second ends of the subset of the second set of available road segments; and
 calculating one or more third probabilities for one or more available road segment of the third set of available road segments at the second ends of the subset of the second set of available road segments, wherein the calculated one or more third probabilities for the one or more available road segment of the third set reflects a respective likelihood of the user selecting the respective one of the one or more available road segment of the third set.

19. The method of claim 17, wherein the one or more first probabilities for the one or more available road segments of the first set are established based, at least in part, on a functional class of the respective available road segment.

20. The method of claim 17, wherein the one or more second probabilities for the one or more available road segments of the second set is established based, at least in part, on a distance attribute of the respective available road segment, wherein the distance attribute is inversely proportional to a distance to the respective road segment from the determined location.

* * * * *